(12) United States Patent
Champion et al.

(10) Patent No.: US 8,385,157 B1
(45) Date of Patent: Feb. 26, 2013

(54) METHOD AND SYSTEM FOR PERFORMING EAMR RECORDING AT HIGH DENSITY USING A LARGE THERMAL SPOT SIZE

(75) Inventors: Eric J. Champion, San Jose, CA (US);
Francis H. Liu, Fremont, CA (US);
Adam F. Torabi, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 76 days.

(21) Appl. No.: 12/570,975

(22) Filed: Sep. 30, 2009

(51) Int. Cl.
*G11B 11/00* (2006.01)
(52) U.S. Cl. .................................. 369/13.01
(58) Field of Classification Search .............. None
See application file for complete search history.

(56) References Cited

U.S. PATENT DOCUMENTS

| | | | |
|---|---|---|---|
| 6,396,776 B1 * | 5/2002 | Ueyanagi | 369/13.33 |
| 6,604,223 B1 * | 8/2003 | Belser et al. | 714/812 |
| 6,967,810 B2 | 11/2005 | Kasiraj et al. | |
| 7,412,143 B2 | 8/2008 | Rottmayer et al. | |
| 8,018,672 B2 * | 9/2011 | Maeda et al. | 360/59 |
| 2005/0069298 A1 | 3/2005 | Kasiraj et al. | |
| 2005/0071537 A1 | 3/2005 | New et al. | |
| 2005/0157597 A1 | 7/2005 | Sendur et al. | |
| 2006/0012907 A1 * | 1/2006 | Ozue | 360/64 |
| 2006/0105203 A1 | 5/2006 | Li et al. | |
| 2006/0114781 A1 * | 6/2006 | Lee | 369/47.5 |
| 2006/0232874 A1 | 10/2006 | Tsuchinaga et al. | |
| 2007/0030588 A1 | 2/2007 | Tsuchinaga et al. | |
| 2007/0058281 A1 | 3/2007 | Ohno et al. | |
| 2007/0223132 A1 | 9/2007 | Tsuchinaga | |
| 2007/0279791 A1 | 12/2007 | Mallary | |
| 2008/0013912 A1 | 1/2008 | Shukh et al. | |
| 2008/0212228 A1 * | 9/2008 | Shibano | 360/77.01 |
| 2009/0237671 A1 * | 9/2009 | Verschuren | 356/448 |
| 2010/0074062 A1 * | 3/2010 | Kamijima et al. | 369/13.14 |

* cited by examiner

*Primary Examiner* — Joseph Feild
*Assistant Examiner* — Henok Heyi

(57) ABSTRACT

A method and system for writing data to a media utilizing an energy assisted magnetic recording (EAMR) head are described. The EAMR head includes at least one laser and at least one EAMR transducer. The laser(s) provide energy. The EAMR transducer(s) are coupled with the laser. The EAMR transducer(s) are configured to direct the energy to spot(s) on the media and to write a plurality of tracks of data in a block. The method and system include writing a track of the plurality of tracks on the media within the spot(s) using the EAMR transducer and stepping a track pitch along a particular radial direction on the media. The method and system also include repeating the writing and stepping steps until the plurality of tracks for the block is written.

16 Claims, 5 Drawing Sheets

000# METHOD AND SYSTEM FOR PERFORMING EAMR RECORDING AT HIGH DENSITY USING A LARGE THERMAL SPOT SIZE

BACKGROUND

FIG. 1 depicts a portion of a conventional energy assisted magnetic recording (EAMR) disk drive 10. The conventional EAMR disk drive 10 includes media 12, slider 14, laser 16, grating 18, and EAMR transducer 20. In operation, the EAMR transducer 20 receives light, or energy, from the conventional laser 16. More specifically, light from the laser 16 is coupled into the grating 18. A waveguide (not explicitly shown in FIG. 1) and, in some embodiments, a near field transducer (NFT) (also not shown) within the EAMR transducer 20 direct the light from the grating to the media 12. An optical spot 22 on the media 12 near the air-bearing surface (ABS) is thus developed. The energy delivered to the conventional media 12 through optical spot 22 heats a small region 24 of the conventional media 12. The region heated is known as the thermal spot 24. The conventional EAMR transducer 10 magnetically writes data within the thermal spot 24 by energizing the write pole (not shown) of the conventional EAMR transducer 20. The region of the conventional media 12 within the thermal spot 24 has a reduced coercivity due to its higher temperature. Therefore, the conventional EAMR transducer 20 may more easily write to the conventional media 12.

Although the conventional EAMR transducer 20 functions, there are drawbacks. Extending the conventional EAMR transducer to higher densities may be problematic due to the thermal spot 24 size. More specifically, the size of the thermal spot 24 may limit reductions in the track pitch. In order to write at higher densities, a smaller thermal spot is desired. Because the conventional media 12 typically includes lower thermal conductivity underlayers, the thermal spot 24 is typically larger than the optical spot 22. Thus an even smaller optical spot 22 is desired at higher densities. In order to obtain a smaller optical spot 22, optical components within the conventional EAMR transducer 20 must be shrunk. Fabrication of portions of the conventional EAMR transducer 20, such as the NFT (not shown), at such small sizes may be challenging. Consequently, shrinking the size of the optical spot 22 and thermal spot 24/24' for higher density recording may be problematic. For conventional EAMR recording, a reduction in the track pitch with respect to thermal spot size may also adversely affect performance. If the spot size is greater than or equal to the track pitch, tracks may be significantly or completely erased. For example, FIG. 2 depicts a portion of the conventional media 12' in which tracks 30, 32, and 34 are written. For each track 30, 32, and 34, the thermal spot 24' is used for writing. The thermal spot 24' has a diameter d. Cross-hatched thermal spots 24' correspond to a magnetic field of one polarity (e.g. out of the plane of the page), while clear/white thermal spots 24' correspond to a magnetic field of another polarity (e.g. into the plane of the page). For clarity, only two spots 24' are labeled. The bits in each track 30, 32, 34 are written in the down track direction (vertically in FIG. 2). The track pitch is TP and less than the thermal spot diameter. A conventional squeeze write scheme is used. In this situation, the track 32 may be inadvertently overwritten by the heating in thermal spot 24' for tracks 30 and 34. Further, techniques such as thermally insulating portions of the conventional media 12/12' or using higher thermal conductivities have been used to achieve a smaller thermal spot size. However, such techniques require re-engineering of the media 12 and thus may have limited utility.

Accordingly, what is needed is a system and method for improving performance of an EAMR transducer, particularly at higher densities.

BRIEF SUMMARY OF THE INVENTION

A method and system for writing data to a media utilizing an energy assisted magnetic recording (EAMR) head are described. The EAMR head includes at least one laser and at least one EAMR transducer. The laser(s) provide energy. The EAMR transducer(s) are coupled with the laser. The EAMR transducer(s) are configured to direct the energy to spot(s) on the media and to write a plurality of tracks of data in a block. The method and system include writing a track of the plurality of tracks on the media within the spot(s) using the EAMR transducer and stepping a track pitch along a particular radial direction on the media. The method and system also include repeating the writing and stepping steps until the plurality of tracks for the block is written.

DETAILED DESCRIPTION OF THE PREFERRED EMBODIMENTS

Figure 1:
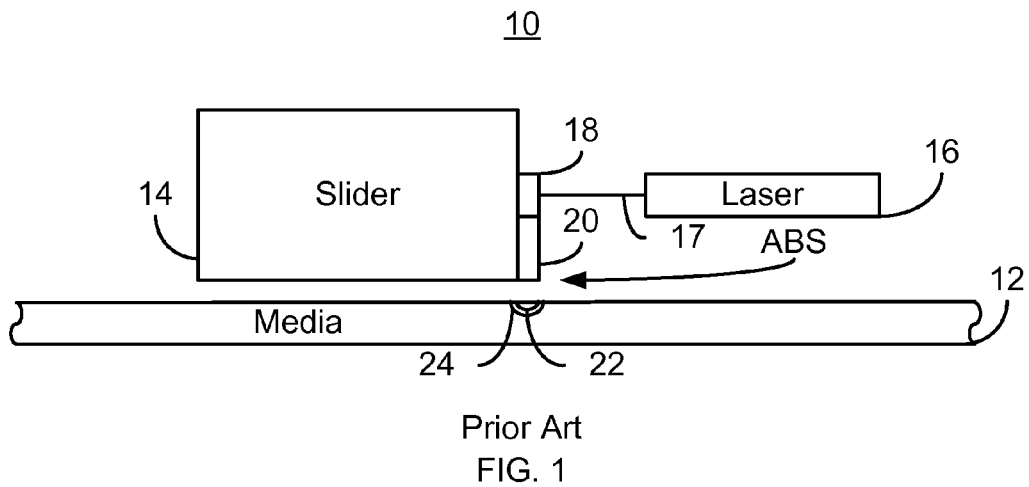
FIG. 1 depicts a side view of a conventional EAMR disk drive.
Figure 2:
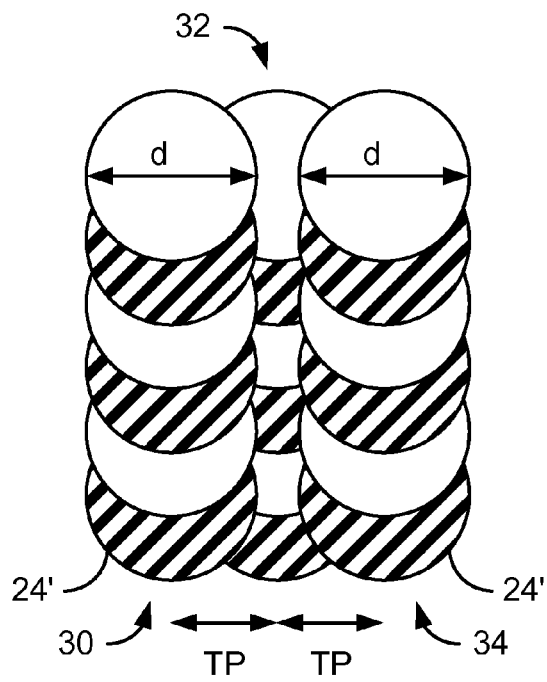
FIG. 2 depicts the spot size versus track pitch on the conventional media for a conventional write scheme.
Figure 3:
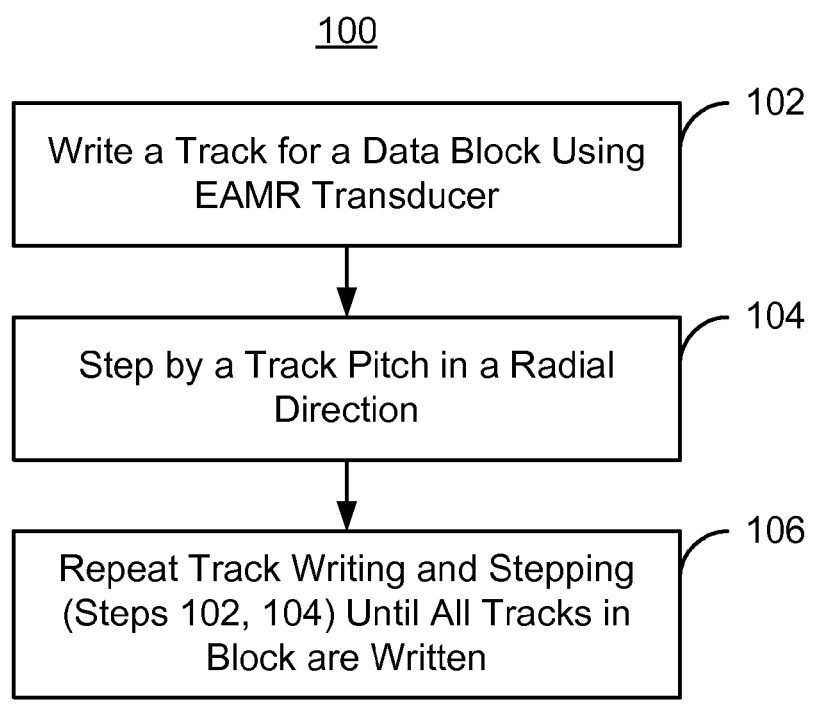
FIG. 3 is a flow chart depicting an exemplary embodiment of a method for writing data to a media using an EAMR transducer.

FIG. 3 is a flow chart depicting an exemplary embodiment of a method 100 for writing data to a media using an EAMR transducer. For simplicity, some steps may be omitted or combined. The method 100 is described in the context of a single EAMR transducer including particular components. However, the method 100 may be implemented substantially in parallel by multiple transducers having additional and/or other components. The method 100 utilizes an EAMR head that includes a laser or analogous energy source and at least one EAMR transducer coupled with the laser. The EAMR head may also include a grating for coupling the energy from the laser with the EAMR transducer. In addition, the EAMR transducer generally includes a waveguide, pole(s), and a coil for driving current that energizes the pole(s). Further, the EAMR transducer may include an NFT for focusing the laser's energy on the media. In the embodiment described, a block of data including multiple tracks is written using the method 100.

A track within the block is written using the EAMR transducer, via step 102. Step 102 includes the EAMR transducer receiving energy (e.g. light) from the laser and directing the energy to a region of the media, termed the optical spot. Thus, the EAMR head may redirect the energy using the waveguide and employ the NFT and/or other mechanisms to focus the energy on the optical spot. As a result, a small region (termed the thermal spot) of the media is heated. As the write pole of the EAMR transducer passes in proximity to the thermal spot, the write pole of the EAMR transducer is energized to a desired polarity, allowing data to be written in the region of the thermal spot. Depending upon the polarity of the magnetic field through the write pole, the data written changes. Because the media is more magnetically disordered in the region of the thermal spot, the media may be written using a smaller magnetic field. This process of writing data to the media continues until the track within the block is written.

Once the track is written, the EAMR transducer is stepped by a track pitch along a particular radial direction on the media, via step 104. In some embodiments, the transducer is stepped in a direction from the center of the media toward the edge. In alternate embodiments, the transducer is stepped by a track pitch in the opposite direction, from the edge to the center. However, for every track in each block, the EAMR transducer is stepped in the same direction each time step 104 is performed. Further, in some embodiments, the track pitch is at least the size of the thermal spot. Because the thermal spot is as large as the optical spot, the track pitch may also greater than or equal to the size of the optical spot. However, in other embodiments, the track pitch may be on the order of the thermal spot, or even smaller than the thermal spot.

Steps 102 and 104, writing and stepping the transducer, are repeated until all of the tracks in the block have been written, via step 106. Thus, the block of data is written. Within the block, the tracks are written such that they overlap in one direction. Each track in the block except the first track written overlaps a previously written adjoining track along the radial direction. Similarly, each track except the last track is overlapped by a next adjacent track in the block. Thus, the tracks are aligned in a manner analogous to shingles on a roof. Consequently, the writing performed by the EAMR transducer in steps 102-106 may be termed shingle writing.

Through the use of shingle EAMR writing in the method 100, the ability of the EAMR transducer to be used at higher recording densities may be improved. Using the method 100, tracks within a block are written in an ordered manner and overlap the previously written track within the block. As a result, the sensitivity of the track pitch for EAMR recording to variations in thermal and optical spot size may be reduced. A smaller track pitch may thus be used for the same thermal spot size. Because of this, the minimum distance requirements for the NFT to achieve a thermal spot of the desired size may be relaxed for smaller track pitches. Thus, EAMR technology may be extended to higher densities without requiring significant changes to fabrication of the NFT or other portions of the EAMR transducer. In addition, use of the method 100 may improve reliability. A given section of the media may undergo less thermal cycling because transitions are not continuously rewritten over the same area. Less thermal cycling translates to greater reliability. Further, with larger thermal and optical spot sizes, less power is required to elevate the media's temperature within the thermal spot to a particular level. As a result, the drive power budget may be relaxed.

Figure 4:
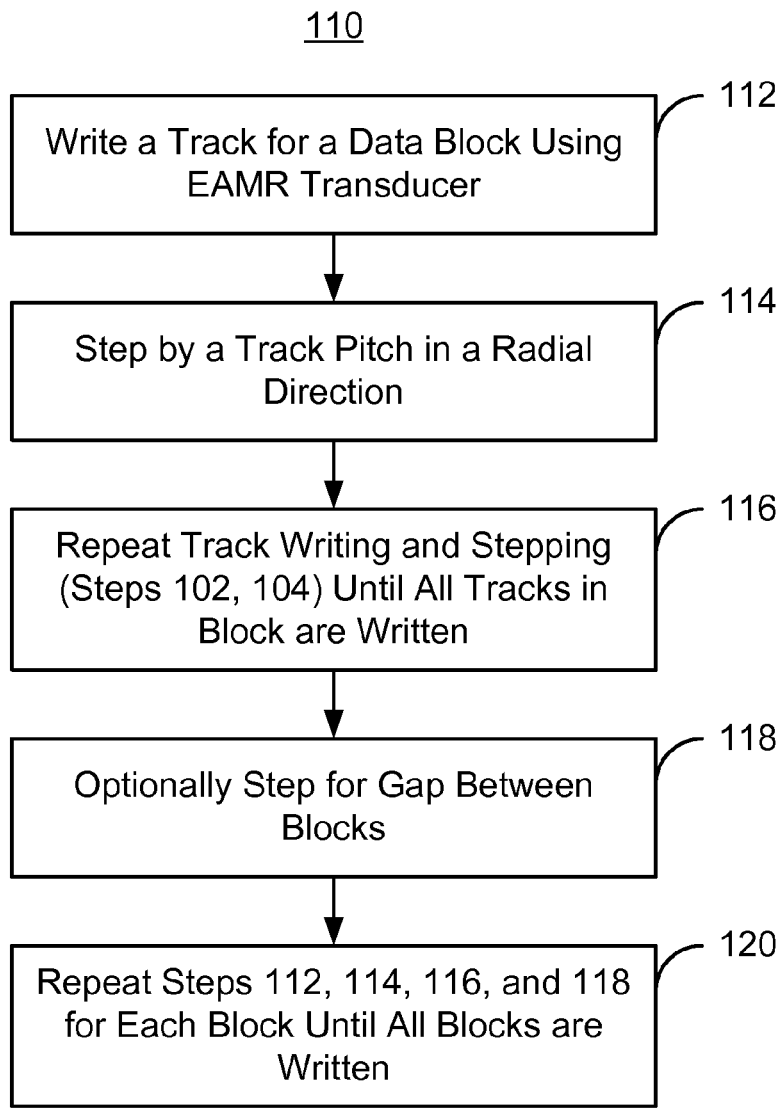
FIG. 4 depicts another exemplary embodiment of a method for writing data to a media using an EAMR transducer.
Figure 5:
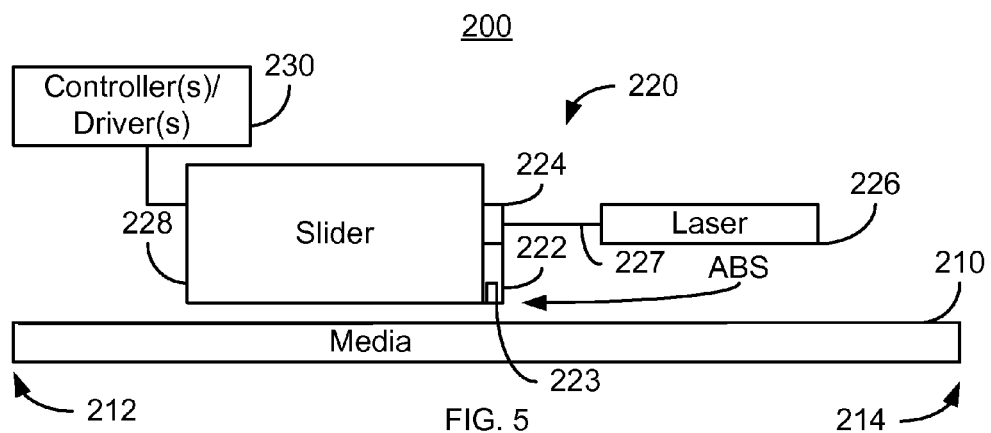
FIG. 5 depicts a top side view of an exemplary embodiment of a portion of an EAMR disk drive.
Figure 6:
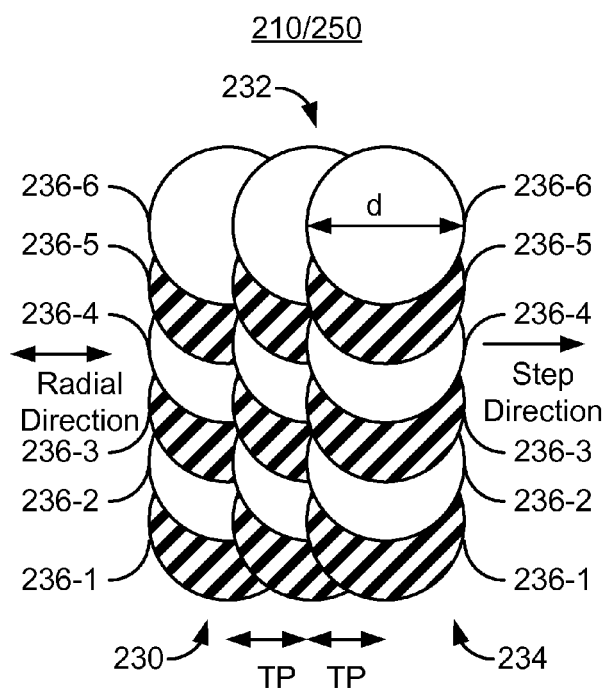
FIG. 6 depicts a top view of an exemplary embodiment of tracks recorded in media using an EAMR transducer.
Figure 7:
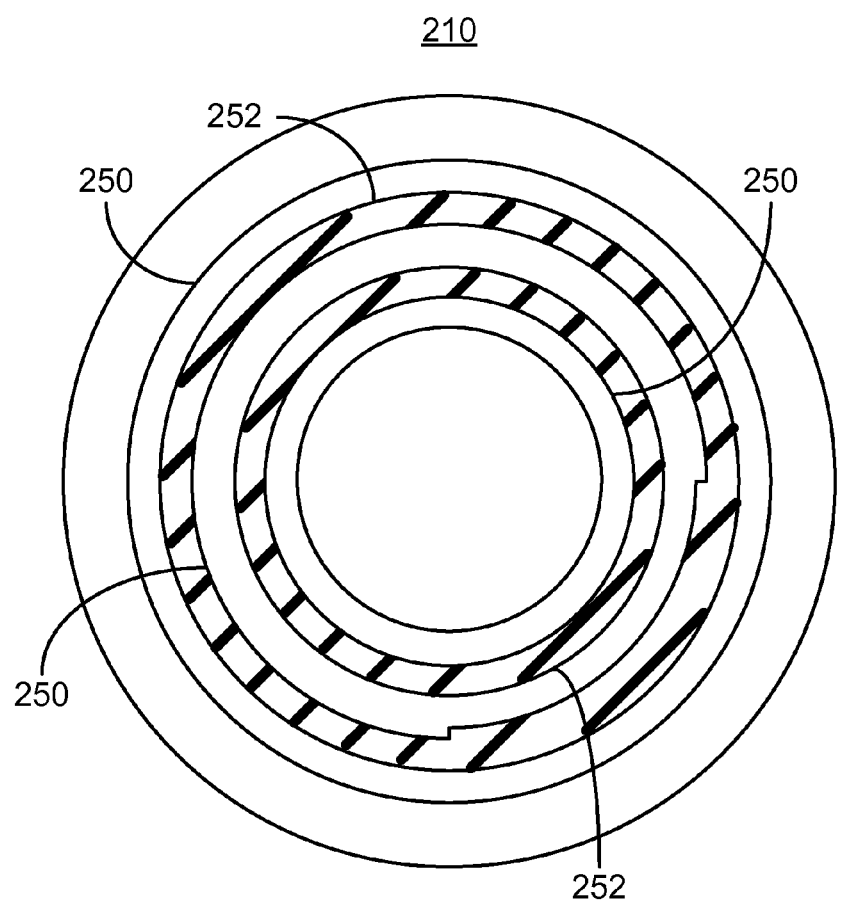
FIG. 7 depicts a top view of an exemplary embodiment of blocks recorded in media using an EAMR transducer.

FIG. 4 depicts another exemplary embodiment of a method 110 for writing data to a media using an EAMR transducer. For simplicity, some steps may be omitted or combined. FIGS. 5-7 depict portions of exemplary embodiments of an EAMR disk drive 200 configured to write using the method 110 or 100. More specifically, FIG. 5 depicts a side view of the EAMR disk drive 200. FIG. 6 depicts a plan view of a portion of the media showing the thermal spot 236 used in writing using the head 220. FIG. 7 depicts a plan view of a portion of the media showing one embodiment of the data blocks 250 being written. For clarity, FIGS. 5-6 are not to scale. Further, although each block 250 is shown as having a certain number of tracks 230, 232, and 234 another number of tracks may be present in each block. Similarly, although each track 230, 232, and 234 is shown as having a particular number of bits, another number of bits may be included in each track. Referring to FIGS. 4-7, the method 110 is described in the context of the EAMR disk drive 200 including media 210, a single EAMR head 220 residing on a slider 228 and including an EAMR transducer 222, grating 224, and laser 226. The EAMR transducer 222 is shown as including a NFT 223. In addition, the media 210 is a disk. However, the method 110 may be implemented in a disk drive having multiple EAMR heads (not shown) analogous to the head 220, multiple disks or other media, additional and/or other components. In addition to the NFT 223, the EAMR transducer generally includes a waveguide, pole(s), and a coil for driving current that energizes the pole(s) which are not shown for clarity. The disk drive 200 also includes controller(s)/drivers 230 for controlling positioning of the EAMR head 220, for example by controlling the position of the actuator (not explicitly shown) to which the EAMR head 220 is affixed. In the embodiment described, blocks of data, each or which includes multiple tracks, are written.

A track within the block is written using the EAMR transducer 222, via step 112. Step 112 is analogous to step 102 of the method described above. Referring to FIG. 6, the track 230 may thus be written for the block 250. The order of the bits written may be shown by thermal spot 236. More specifically, thermal spot 236-1 is used to write the first bit of the track 230, thermal spot 236-2 is used to write the second bit of the track 230, thermal spot 236-3 is used to write the third bit of the track 230, thermal spot 236-4 is used to write the fourth bit of the track 230, thermal spot 236-5 is used to write the fifth bit of the track 230, and thermal spot 236-6 is used to write the sixth bit of the track 230. Thus, the down track direction is vertical in FIG. 6.

Once the track 230 is written, the EAMR transducer 222 is stepped by a track pitch along a particular radial direction on the media 210, via step 114. Step 114 is analogous to step 104. In some embodiments, the transducer is stepped in a direction from the center 212 of the media 210 toward the edge 214. In alternate embodiments, the head 220 is stepped by a track pitch in the opposite direction, from the edge 214 to the center 212. In the embodiment shown in FIG. 6, the head 220 is stepped by the track pitch, TP, from left to right. For every track 230, 232, and 234 in each block, the EAMR head 220 is stepped in the same direction each time step 114 is performed. Controller(s)/drivers 230 may be used in controlling movement of the head 220 in step 114.

Steps 112 and 114, writing and stepping the transducer, are repeated until all of the tracks in the block 250 have been written, via step 116. Step 116 is analogous to step 106 of the method 100 depicted in FIG. 3. Referring back to FIGS. 4-7, the track 232 is written next using step 112. The transducer 222 is then stepped to the right by the track pitch TP again. The track 234 is then written. Again, the bits in each of the tracks are written in order, from 236-1 to 236-6. Thus, the block 250 of data is written. Within the block, the tracks 230, 232, and 234 are written such that they overlap in one direction. Each track in the block except the first track written overlaps a previously written adjoining track along the radial direction. Thus, the track 232 overlaps the right side of track 230. Track 234 overlaps the right side of track 232.

The EAMR head 220 is optionally stepped to provide a gap between blocks, via step 118. FIG. 7 depicts the blocks 250 with gaps 252 (shown cross-hatched) between. The gaps 252 may be used in the event that data in the blocks 250 are rewritten.

The previous steps 112, 114, 116, and 118 are repeated until all of the desired data are written, via step 120. Thus, the blocks 250 (only one of which is marked for clarity) are written. Consequently, the desired data can be written.

The method 110 shares the benefits of the method 100. More specifically, the ability of the EAMR head 220 to be used at higher recording densities may be improved. Using the method 110, tracks 230, 232, 234 within a block 250 overlap the previously written track within the block 250 in a predictable manner. A smaller track pitch, TP, may thus be used for the same thermal spot size 236. In some embodiments, the track pitch is not less than the thermal spot size 236. However, as shown in FIG. 6, in some embodiments, the track pitch may be less than the spot size, d, while still maintaining sufficient definition for operation. Because of track pitch is less dependent upon the spot size, the minimum distance requirements for the NFT 223 may be relaxed. Thus, EAMR technology may be extended to higher densities without requiring significant changes to fabrication of the EAMR transducer 222. In addition, because there is less thermal cycling and a lower power requirement, use of the method 110 may improve reliability and reduced power consumption. Consequently, the EAMR disk drive 200 may be more suited to higher density recording using the shingle writing methods 100 and/or 110.

We claim:

1. A method for writing data to a media utilizing an energy assisted magnetic recording (EAMR) head, the EAMR head including a laser for providing energy and at least one EAMR transducer coupled with the laser, the EAMR transducer configured to direct the energy to at least one spot on the media and to write a plurality of tracks of data in a block, the method comprising:
writing a track of the plurality of tracks on the media within the at least one spot using the EAMR transducer;
stepping a track pitch along a particular radial direction on the media;
repeating the writing and stepping steps until the plurality of tracks for the block is written, such that each of the plurality of tracks except a first track overlaps a previously written adjoining track along the particular radial direction and such that each track except a last track is overlapped by a next adjacent track in the block.

2. The method of claim 1 wherein the media has a center and an edge and wherein the particular radial direction is from the center toward the edge.

3. The method of claim 1 wherein the media has a center and an edge and wherein the particular radial direction is from the edge toward the center.

4. The method of claim 1 further comprising:
providing a space between the block and another block of a plurality of blocks.

5. The method of claim 1 wherein the spot has a width not less than the track pitch.

6. An energy assisted magnetic recording (EAMR) head for writing to a media comprising:
at least one laser for providing energy for writing to the media;
at least one EAMR transducer coupled with the at least one laser, the at least one EAMR transducer configured to direct the energy to at least one spot on the media and to write a plurality of tracks of a block of data in order along a particular radial direction for the media such that each track overlaps a previous adjacent track and is overlapped by a next adjacent track.

7. The EAMR head of claim 6 wherein the media has a center and an edge and wherein the particular radial direction is from the center toward the edge.

8. The EAMR head of claim 6 wherein the media has a center and an edge and wherein the particular radial direction is from the edge toward the center.

9. The EAMR head of claim 6 wherein the EAMR head is further configured to provide a space between the block and another block of a plurality of blocks.

10. The EAMR head of claim 6 wherein the spot has a width not less than a track pitch.

11. An energy assisted magnetic recording (EAMR) disk drive comprising:
a media;
a slider;
at least one laser coupled with the slider for providing energy;
at least one EAMR transducer coupled with the slider and the at least one laser, the at least one EAMR transducer configured to direct the energy to at least one spot on the media and to write a plurality of tracks for a block of data in order along a particular radial direction for the media such that each track overlaps a previous adjacent track and is overlapped by a next adjacent track.

12. The EAMR disk drive of claim 11 wherein the media includes at least one block of written data, each the at least one block including a plurality of written tracks extending across the media along the particular radial direction, each written track of the plurality of written tracks except a first written track overlapping a previous adjacent written track of the plurality of written tracks and each written track of the plurality of written tracks except a last written track being overlapped by a next adjacent written track of the plurality of written tracks.

13. The EAMR disk drive of claim 11 wherein the media has a center and an edge and wherein the particular radial direction is from the center toward the edge.

14. The EAMR disk drive of claim 11 wherein the media has a center and an edge and wherein the particular radial direction is from the edge toward the center.

15. The EAMR disk drive of claim 11 wherein the EAMR transducer is configured to provide a space between the block and another block of a plurality of blocks.

16. The EAMR disk drive of claim 11 wherein the spot has a width not less than the track pitch.

* * * * *